United States Patent
Chang et al.

(10) Patent No.: US 7,146,275 B2
(45) Date of Patent: Dec. 5, 2006

(54) DIGITAL MAP GENERATING SYSTEM AND ITS METHOD

(75) Inventors: Zechary Chang, Taipei (TW); Iris Yang, Beijing (CN)

(73) Assignee: Inventec Corporation, Taipei (TW)

( * ) Notice: Subject to any disclaimer, the term of this patent is extended or adjusted under 35 U.S.C. 154(b) by 137 days.

(21) Appl. No.: 10/895,097

(22) Filed: Jul. 21, 2004

(65) Prior Publication Data
US 2006/0020388 A1 Jan. 26, 2006

(51) Int. Cl.
*G01C 21/30* (2006.01)
(52) U.S. Cl. ...................................................... 701/212
(58) Field of Classification Search ................ 701/212; 340/995.2, 995.24, 995.26, 995.27
See application file for complete search history.

(56) References Cited

U.S. PATENT DOCUMENTS 5,270,937 A * 12/1993 Link et al. ................... 701/209
2003/0059091 A1* 3/2003 Kambe et al. .............. 382/113

* cited by examiner

*Primary Examiner*—Thu V. Nguyen
(74) *Attorney, Agent, or Firm*—Rabin & Berdo, P.C.

(57) ABSTRACT

A digital map generating system retrieves all geographical area information associated with the primary geographical information to generate and store a plurality of target area scalar maps. When the user conducts a search and inputs the search area, one predefined scalar map will be displayed. The processing and waiting time thereby is reduced, and the performance of the digital map utilization is improved.

10 Claims, 5 Drawing Sheets

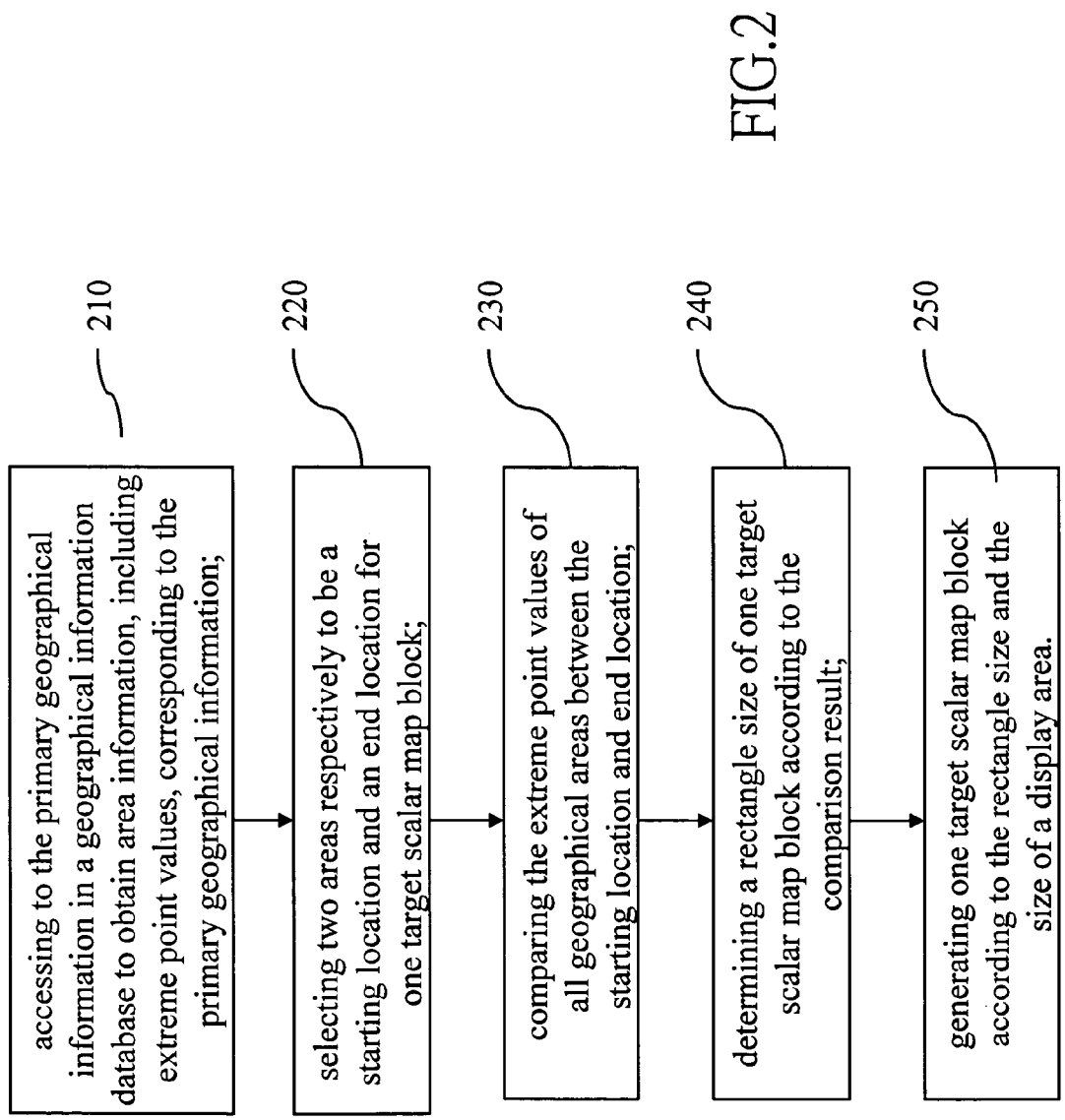

DIGITAL MAP GENERATING SYSTEM AND ITS METHOD

BACKGROUND OF THE INVENTION

1. Field of Invention

The present invention relates to a digital map generating system and its method. More particularly, the invention provides a system and its method that allows fast search of digital maps.

2. Related Art

Graphic maps can be diversified into many types specifically to be adapted for different uses for different users, such as road maps, geographical maps, topographic maps, and so on.

Traditional geographic maps are conventionally produced via a number of processing steps including measurement, data records, manual drawing, sampling, editing, and printing. This conventional production method is time-consuming and involves high labor cost. Since the year of 1960, the evolution of computer technology has permitted to digitalize information, and revolutionize the map production methods. In particular, the development of GIS technique led a significant progress in the display of geographical data, and digital maps, which rapidly replaced the traditional analog maps made on paper. Digital maps have many advantages including a low production cost, high data content capacity, long lasting life, high accuracy of details, and easy updating manipulations.

Currently, digital maps are conventionally processed from a scalar map database. After the user selected a search area, computation is conducted based on the scalar map database and scalar data; then transmitted to the user interface. Conventionally, while the user browses the digital maps, successive search manipulations usually require the generation of new maps, which results in a long processing time. The waiting time may be excessively long in some cases, and the user may be discouraged from using the digital maps since it may be quicker to search the traditional paper maps.

Therefore, there is a need for a processing method that allows fast search and display of the digital maps to reduce the processing time.

SUMMARY OF THE INVENTION

It is therefore an objective of the invention to provide a digital map generating system and its method that allows fast search and display of the digital maps to improves the performance of map utilization.

To achieve the above and other objectives, a digital map generating system is provided to generate a plurality of target scalar map blocks according to the geographical area information. The digital map generating system comprises: a geographical information database that stores primary geographical information (such as roads, rivers and railways); an area information database that stores geographical area information (regional areas such as cities) corresponding to the primary geographical information; an area parameter database that stores the area extreme point values corresponding to each geographical (regional) area; a target area access module that selects two geographical areas to be the starting and end locations of one target scalar map block; a comparator module that compares the extreme point values of all geographical areas between the starting location and end location; an area-computing module that determines a rectangle size of the target scalar map block according to the comparison result; a map division module that generates one target scalar map block with a size and ratio corresponding to the rectangle size and a display area ratio; and a storage module that stores the target scalar map blocks.

According to an embodiment of the invention, a method of generating and displaying digital maps is provided. The method comprises: accessing the geographical information and the corresponding area information, including extreme point values, from a geographical information database; selecting two areas to be the starting and end locations respectively for one target scalar map block; comparing the extreme point values of all geographical areas between the starting location and end location; determining a rectangle size of one target scalar map block according to the comparison result; and generating one target scalar map block according to the rectangle size and the size of a display area.

According to the digital map generating method of the invention, scalar maps of different geographical information are stored. When the user conducts a search, the scalar map can be divided into map blocks according to the user's selection of the starting location and end location. The target area map can be thereby displayed. With this embodiment, there is no need to generate the maps on-the-spot since the maps are generated and stored into a plurality of divisions in a backstage map database. The map search speed is thereby improved, and the waiting time is reduced.

Further scope of the applicability of the present invention will become apparent from the detailed description given hereinafter. However, it should be understood that the detailed description and specific examples, while indicating preferred embodiments of the invention, are given as illustrations only, and various changes and modifications within the spirit and scope of the invention are permitted and will become apparent to those skilled in the art from this detailed description.

BRIEF DESCRIPTION OF THE DRAWINGS

The present invention will become fully understood from the detailed description given hereinbelow for illustration only and is not limitative of the present invention, and wherein:

FIG. 2 is the flowchart of the digital map generating method according to an embodiment of the invention.

DETAILED DESCRIPTION OF THE INVENTION

The invention provides a digital map generating system and its method, which can automatically access to a backstage map database to process geographical data, and thereby generates and displays a map of the areas desirably selected by the user. The map is stored as a scalar map. When the user conducts a search, the map is displayed.

Figure 1:
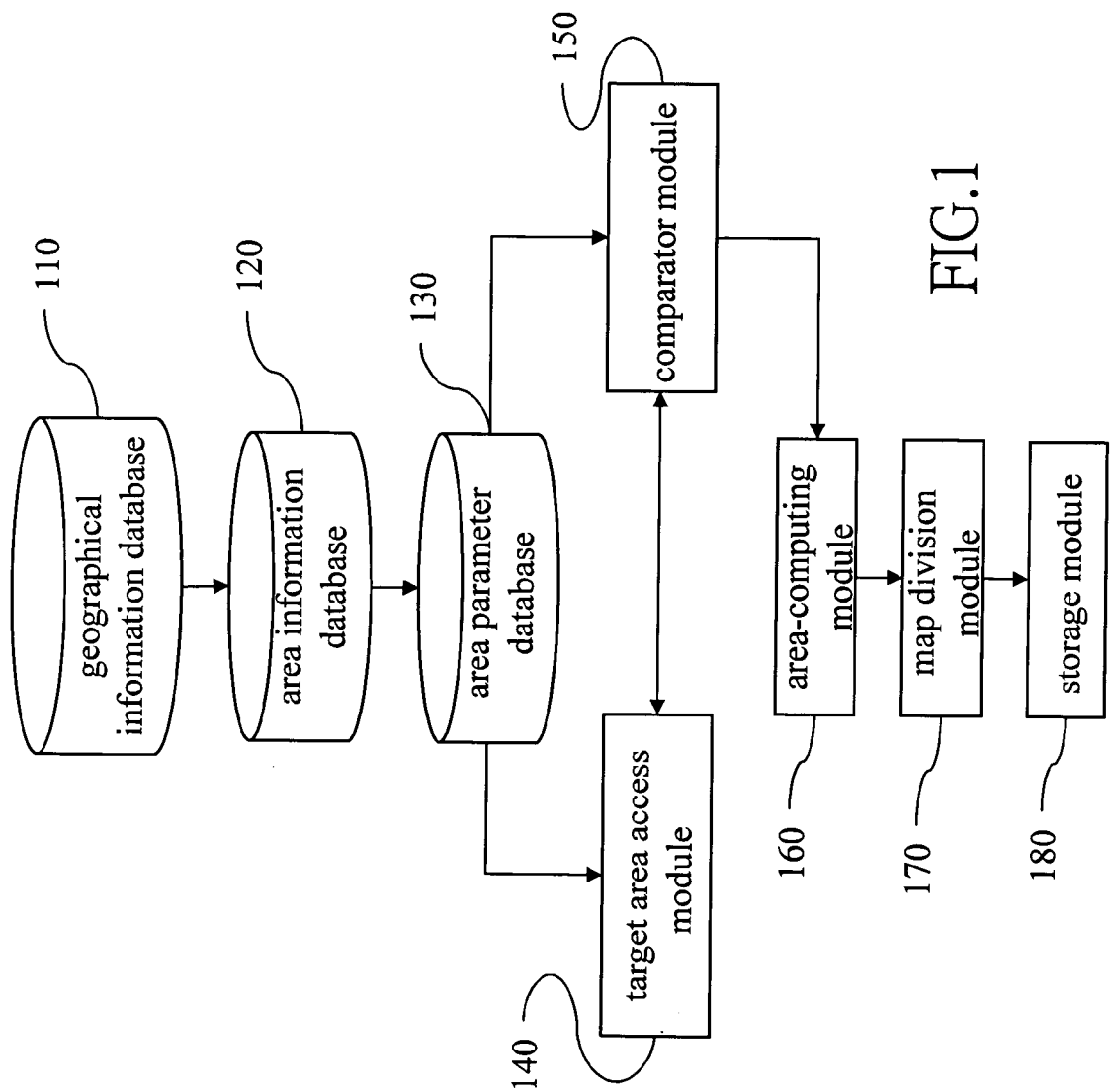
FIG. 1 is the block diagram of a digital map generating system according to an embodiment of the invention.

FIG. 1 is the schematic view of a digital map generating system according to an embodiment of the invention.

A geographical information database 110 stores primary geographical information such as road information, railway information, river stream information, and so on.

An area information database 120 stores geographical area information corresponding to the primary geographical information. The "primary geographical information" therefore is linked to the area information.

An area parameter database 130 stores all extreme point values that define each regional area. The extreme point values or "extremes" are the coordinates of the peripherally farthest points of the area boundary. The area extremes together define a rectangle circumjacent to the regional area. The extreme point values include north or top extreme, bottom or south extreme, left or west extreme, and right or east extreme.

A target area access module 140 accesses two regional areas among all regional areas, and references these regional areas as the starting location and end location.

A comparator module 150 compares the extreme values of all regional areas between the starting location and end location to obtain the peripherally farthest extremes.

An area-computing module 160 determines a rectangle size of the target scalar map block according to the comparison results obtained by the comparator module 150. In other words, the rectangle size is calculated according to the peripherally farthest points.

A map division module 170 generates a target scalar map block with a size and a ratio according to the rectangle size and the size of the display area. The size of the display area can be a size preset by the user.

A storage module 180 stores the obtained target scalar map block.

FIG. 2 is the flowchart of a digital map generating method according to an embodiment of the invention. First, primary geographical information is accessed in the map database, as well as all the corresponding regional areas with the area extremes (step 210). The extreme values define the peripherally farthest points of the area in north-south (or top-bottom) and east-west (or left-right) directions. Two regional areas among all the regional areas are taken to be the starting and end locations of one target scalar map block (step 220). The extreme values of all regional areas between the starting and end locations are compared to one another (step 230). According the comparison result, a rectangle size of the target scalar map block is determined (step 240). In other words, the rectangle size is determined according to the peripherally farthest points of all regional areas between the selected starting and end locations. Finally, the target scalar map block is generated according to the rectangle size and the preset size of the display area (step 250).

One application of the invention is described in detail hereafter for a road map.

According to the geographical records, the system establishes a geographical database, as shown in Table 1. The geographical database contains information such as geographical information number, name, category, and brief description.

TABLE 1

| Geographical information number | Geographical information name | Geographical information category | Geographical information description |
|---|---|---|---|
| 1 | 102 national road | National road | |
| 2 | Jing-Jiu rail road | Rail road | |
| 3 | Jing-Ha highway | Highway | |
| . | . | . | |
| . | . | . | |
| . | . | . | |
| 1280 | Hasai road | Provincial road | |

In this embodiment, the geographical information further includes the roads and its corresponding area information (for example, cities the roads cross). Thus, a relation between the geographical information database and the area information database is established. Table 2 shows an example of the area information database.

TABLE 2

| Area information number | Regional Area information name |
|---|---|
| 0101 | Beijing |
| 0201 | Tianjin |
| 0301 | Shanghai |
| . | . |
| . | . |
| . | . |
| 0403 | Taiyuan |
| . | . |
| . | . |
| . | . |

TABLE 3

| Map division number | Geographical information number | Area information number | North extreme | West extreme | South extreme | East extreme | Order |
|---|---|---|---|---|---|---|---|
| 1 | 1 | 0101 | 20 | 70 | 50 | 80 | 1 |
| 2 | 1 | 0609 | 35 | 24 | 42 | 93 | 12 |
| 3 | 3 | 0403 | 10 | 400 | 80 | 190 | 8 |
| . | . | . | . | . | . | . | . |
| . | . | . | . | . | . | . | . |
| 891 | 60 | 0405 | 124 | 89 | 367 | 15 | 3 |

The map information database also records the extremes of each area. All extreme values are stored in an area parameter database, as Table 3 shows.

According to the geographical information, the invention generates target scalar maps. The geographical information is therefore sequentially accessed in the geographical information database. For example, road information "National road 209" having the geographical information number "89" is retrieved from the geographical information database. The National road 89 passes through the cities of Han Haote, Yuncheng, San Menxia, Shiyan, Shen Nungjia, Enshi, Xiangxi, Huaihua, Liuzhou, and Beihai. The corresponding area information numbers in the area information database are 010510, 010410, 011612, 011701, 01171709, 01171302, 011813, 011808, 012005, and 01170827 respectively. These regional areas then are paired: each pair defines a starting location and an end location so that the target scalar map blocks can be generated respectively. For example, when a target scalar map block is to be created between the cities of Shiyan and Huaihua, the system will search the extreme values of all city areas in which the road "89" crosses from Shiyan (with the area information number 011701 ) to Huaihua (with the area information number 011808 ). The extreme values include quadruplets of top, left bottom, and right (or north, west, south, east) extreme points, which are respectively: (2520, 2580, 2600, 2600), (2600, 2580, 2640, 2600), (2600, 2480, 2700, 2650), (2700, 2430, 2780, 2480), and (2780, 2410, 2850, 2480). These extremes are compared to one another to obtain the boundary extreme quadruplet (2520, 2410, 2850, 2650). According to the rectangle size (2520, 2410, 2850, 2650) being defined by the boundary extremes, and fixed display size (width: 480, height: 360, ratio: 480/360) of the display interface, computation is performed to determine the location (2510, 2290, 2870, 2770) and the size (width: 480, height: 360) of the map block. The system of the invention then activates the Photoshop® software, and uses its SDK functions such as SelectRectangle (Top As Double, Left As Double, Bottom As Double, Right As Double), Crop( ), as well as the parameters of the map block location and the map block size to capture the target scalar block on the map. A scalar map having adequate size and ratio (width: 480, height: 360, ratio: 480/360) is thereby generated, and stored under a file name, for example, 89_8_9.gif. According to this method, all target area maps in connection to the National road 209 are created and geographical information is accessed to form the corresponding scalar maps subsequently. This operation is repeated until the maps corresponding to all geographical information are achieved. All map blocks then are stored in the form of a complete digital map.

Figure 3A:
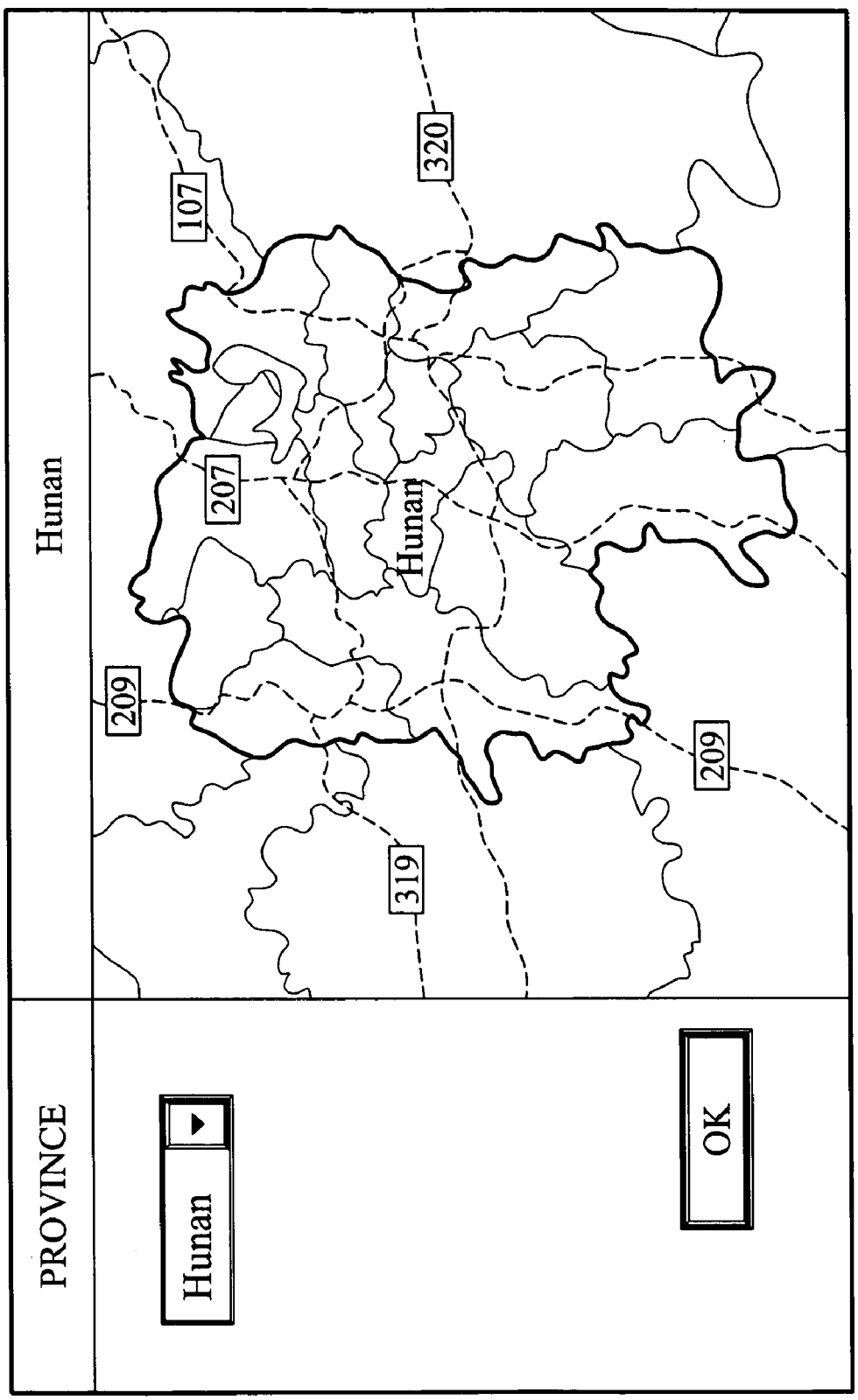
FIG. 3a~3c are schematic views illustrating the use of an embodiment of the invention.
Figure 3B:
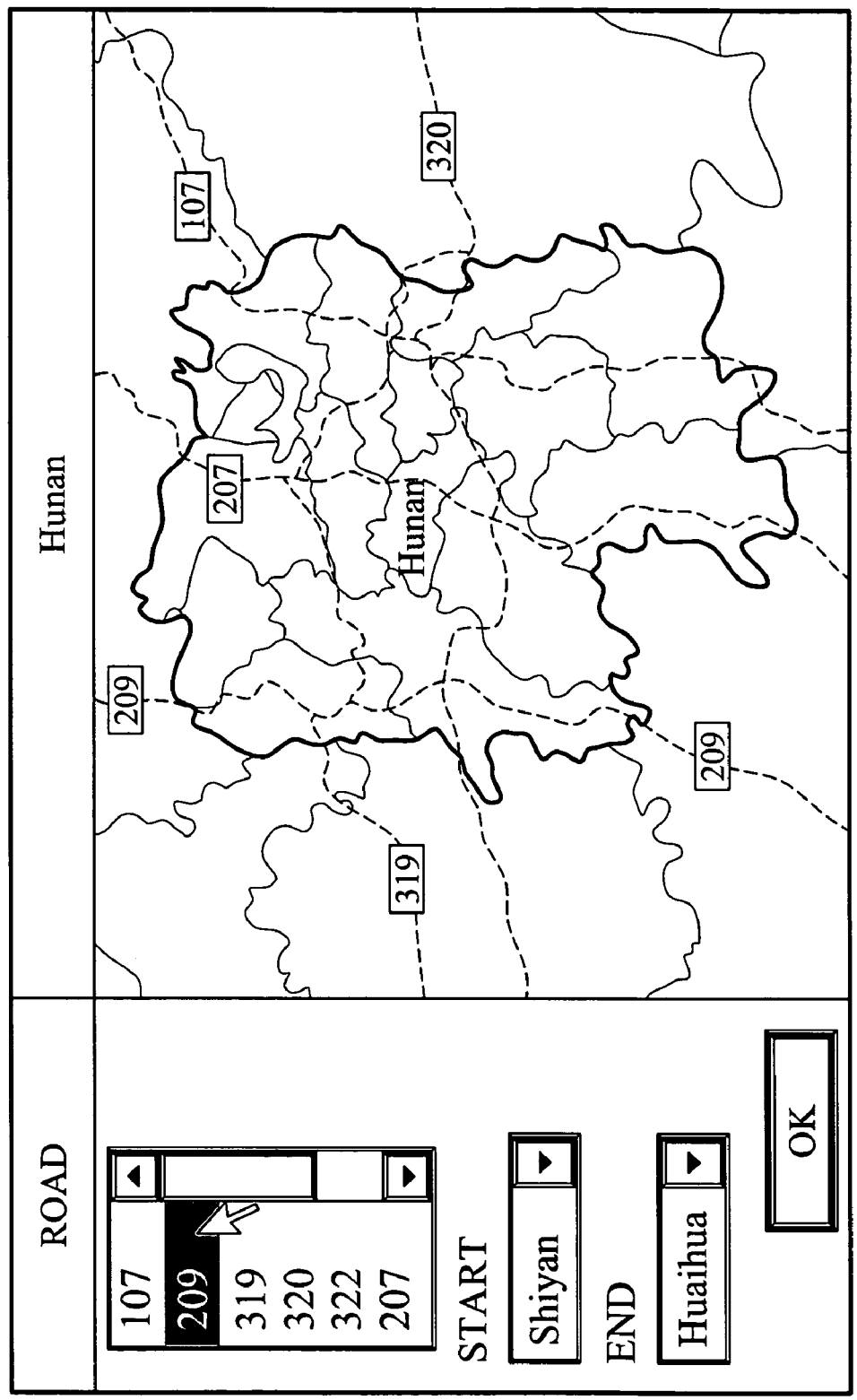
Figure 3C:
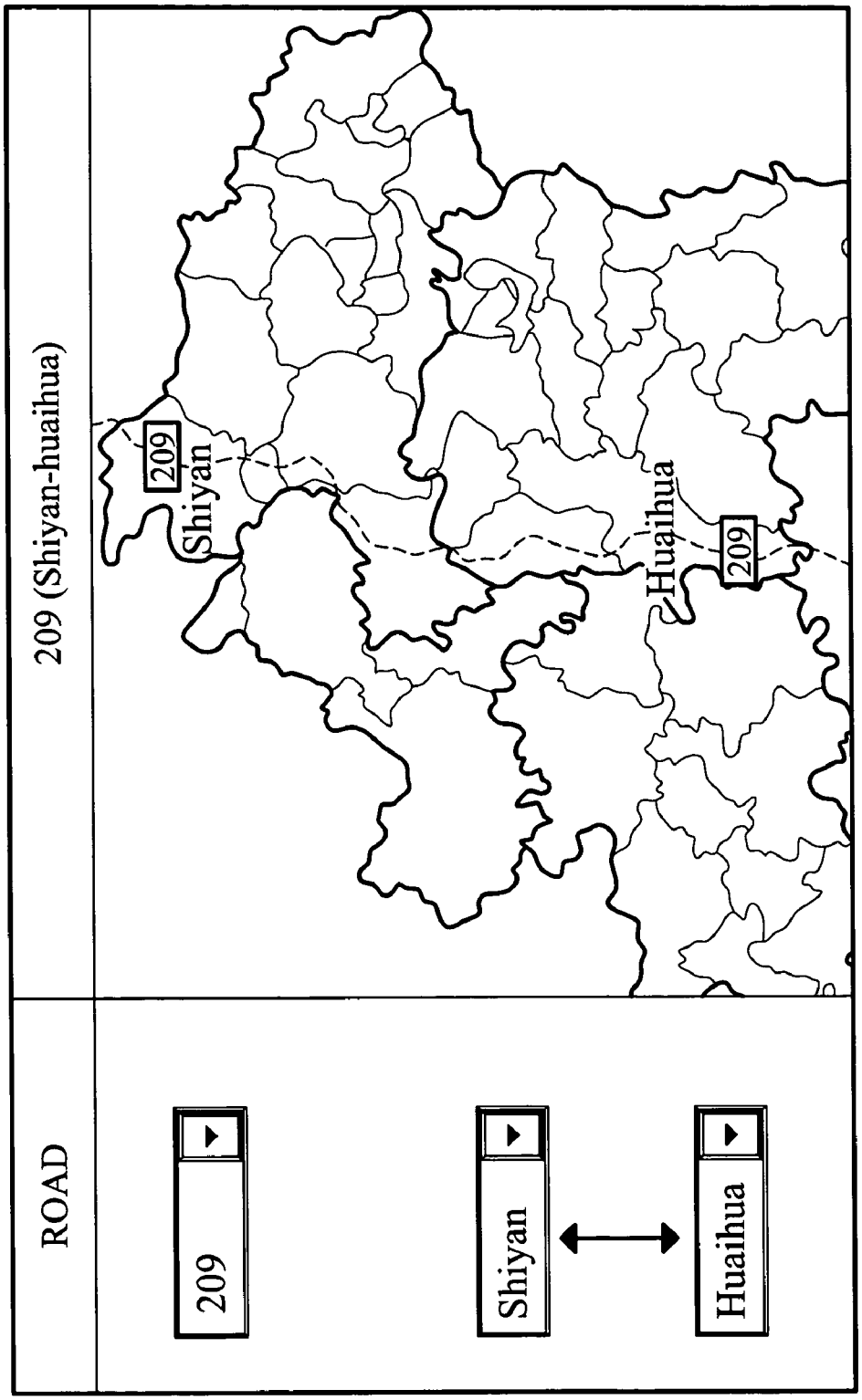

FIG. 3*a*~3*c* illustrate a user interface according to an embodiment of the invention. In FIG. 3*a*, after the user selects the province of Hunan from the index of the display interface, the display area shown on the right side displays the Hunan province map. The user then selects the National road 209 so the system accesses and displays the scalar map blocks corresponding to the National road 209 with a geographical information number 209. FIG. 3*b* illustrates the resulting display. If the user selects Shiyan and Huaihua respectively in the "starting location" field and "end location" field of the display interface, the system will access to the file 89_8_9.gif in the storage module, and opens it for display. Thereby, the desired map area is displayed in larger dimensions, as shown in FIG. 3*c*.

The present invention can also be implemented to provide on-the-spot map search. When a user inputs the starting and end locations on a digital map, the system will create the target scalar map block according to the user's input on-the-spot. The generated map block then is displayed in the display zone of the display interface to reduce the amount of map blocks s stored.

It will be apparent to the person skilled in the art that the invention described above may be varied in many ways, while remaining the spirit and scope of the invention as defined in the following claims.

What is claimed is:

1. A digital map generating system, generating a target scalar map block according to primary geographical area information, the generating system comprising:
   a geographical information database, storing the primary geographical area information;
   an area information database, storing regional area information of respective regional areas corresponding to the primary geographical information;
   an area parameter database, storing extreme point values of each of the regional areas;
   a target area access module, selecting the regional area information of two of the regional areas to be a starting location and an end location for the target scalar map block;
   a comparator module, comparing the extreme point values of each of the regional areas with the extreme point values of the starting location and end location;
   an area-computing module, determining a rectangle size of said target scalar map block according to a result of the comparison;
   a map division module, generating said target scalar map block according to the rectangle size and a display scale to include the regional areas of the starting location and the end location; and
   a storage module, storing the target scalar map block.

2. The system of claim 1, wherein the primary geographical area information includes road information.

3. The system of claim 1, wherein the extreme point values of one regional area are the peripherally farthest points delimiting a rectangle circumjacent to the regional area, the extreme point values include a north extreme, a west extreme, a south extreme, and an east extreme.

4. The system of claim 1, wherein the area-computing module determines the rectangle size of said target scalar map block according to the peripherally farthest of all extreme point values to cover the starting location and end location.

5. The system of claim 1, wherein the display scale is a fixed value preset by a user.

6. A method of generating a digital map, wherein a target scalar map block is generated according to primary geographical area information, the method comprising:
   accessing the primary geographical area information from a geographical information database to obtain area information for a plurality of regional areas, the area information for each of the regional areas including extreme point values, corresponding to the primary geographical area information;
   selecting two of the regional areas respectively to be a starting location and an end location for the target scalar map block;
   comparing the extreme point values of each of the regional areas with the extreme point values of the starting location and end location;
   determining a rectangle size of said target scalar map block according to a result of the comparison; and
   generating said target scalar map block according to the rectangle size and a display scale to include the regional areas of the starting location and the end location.

7. The method of claim 6, wherein the primary geographical area information include road information.

8. The method of claim 6, wherein extreme point values of one regional area are the peripherally farthest points delimiting a rectangle circumjacent to the regional area, where the extreme point values include a north extreme, a west extreme, a south extreme, and an east extreme.

9. The method of claim 6, wherein determining the rectangle size of said target scalar map block is performed according to the peripherally farthest of all extreme point values to cover the startina location and end location.

10. The method of claim 6, wherein the display scale is a fixed value preset by a user.

* * * * *